US010979337B2

(12) United States Patent
Chen et al.

(10) Patent No.: US 10,979,337 B2
(45) Date of Patent: *Apr. 13, 2021

(54) I/O ROUTING IN A MULTIDIMENSIONAL TORUS NETWORK

(71) Applicant: International Business Machines Corporation, Armonk, NY (US)

(72) Inventors: Dong Chen, Scarsdale, NY (US); Noel A. Eisley, Wappingers Falls, NY (US); Philip Heidelberger, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,804

(22) Filed: Jan. 29, 2020

(65) Prior Publication Data

US 2020/0228435 A1 Jul. 16, 2020

Related U.S. Application Data

(63) Continuation of application No. 16/404,114, filed on May 6, 2019, now Pat. No. 10,601,697, which is a
(Continued)

(51) Int. Cl.
*G06F 15/17* (2006.01)
*H04L 12/701* (2013.01)
(Continued)

(52) U.S. Cl.
CPC ........ *H04L 45/00* (2013.01); *G06F 15/17387* (2013.01); *H04L 45/06* (2013.01)

(58) Field of Classification Search
CPC .... G06F 15/17387; H04L 45/00; H04L 45/06
See application file for complete search history.

(56) References Cited

U.S. PATENT DOCUMENTS 5,752,068 A 5/1998 Gilbert
5,959,995 A 9/1999 Wicki et al.
(Continued)

OTHER PUBLICATIONS

Puente et al., "Adaptive Bubble Router: a Design to Improve Performance in Torus Networks", IBM Market Insights, downloaded on Nov. 12, 2009, from IEEE Xplore, pp. 1-10.
(Continued)

*Primary Examiner* — Henry Tsai
*Assistant Examiner* — John B Roche
(74) *Attorney, Agent, or Firm* — Scully, Scott, Murphy & Presser, P.C.; Daniel Morris, Esq.

(57) ABSTRACT

A method, system and computer program product are disclosed for routing data packet in a computing system comprising a multidimensional torus compute node network including a multitude of compute nodes, and an I/O node network including a plurality of I/O nodes. In one embodiment, the method comprises assigning to each of the data packets a destination address identifying one of the compute nodes; providing each of the data packets with a toio value; routing the data packets through the compute node network to the destination addresses of the data packets; and when each of the data packets reaches the destination address assigned to said each data packet, routing said each data packet to one of the I/O nodes if the toio value of said each data packet is a specified value. In one embodiment, each of the data packets is also provided with an ioreturn value used to route the data packets through the compute node network.

19 Claims, 3 Drawing Sheets

Related U.S. Application Data continuation of application No. 15/956,235, filed on Apr. 18, 2018, now Pat. No. 10,348,609, which is a continuation of application No. 15/420,588, filed on Jan. 31, 2017, now Pat. No. 9,954,760, which is a continuation of application No. 12/697,175, filed on Jan. 29, 2010, now Pat. No. 9,565,094.

(51) Int. Cl.
*H04L 12/721* (2013.01)
*G06F 15/173* (2006.01)

(56) References Cited

U.S. PATENT DOCUMENTS

| | | | |
|---|---|---|---|
| 5,987,629 | A | 11/1999 | Sastry et al. |
| 7,305,487 | B2 | 12/2007 | Blumrich et al. |
| 8,995,301 | B1 | 3/2015 | Miller et al. |
| 9,203,747 | B1 | 12/2015 | Brandwine et al. |
| 9,565,094 | B2 * | 2/2017 | Chen ................ G06F 15/17387 |
| 9,954,760 | B2 * | 4/2018 | Chen ........................ H04L 45/06 |
| 10,348,609 | B2 * | 7/2019 | Chen ........................ H04L 45/00 |
| 10,601,697 | B2 * | 3/2020 | Chen ................ G06F 15/17387 |
| 2003/0007493 | A1 | 1/2003 | Oi et al. |
| 2004/0034747 | A1 | 2/2004 | Rowlands et al. |
| 2004/0037313 | A1 | 2/2004 | Gulati et al. |
| 2005/0195808 | A1 | 9/2005 | Chen et al. |
| 2006/0101025 | A1 | 5/2006 | Tichy et al. |
| 2008/0091842 | A1 | 4/2008 | Blumrich et al. |
| 2008/0263387 | A1 | 10/2008 | Darrington et al. |
| 2009/0006808 | A1 | 1/2009 | Blumrich et al. |
| 2009/0274157 | A1 | 11/2009 | Vaidya et al. |

OTHER PUBLICATIONS

Dally et al., "Deadlock-Free Message Routing in Multiprocessor Interconnection Networks", IEEE Transactions on Computers, vol. C-36, No. 5, May 5, 1987, pp. 547-553.

Duato et al., "A General Theory for Deadlock-Free Adaptive Routing Using a Mixed Set of Resources", IEEE Transactions on Parallel and Distributed Systems, vol. 12, No. 12, Dec. 2001, pp. 1219-1235.

Adiga et al., "Blue Gene/L torus interconnection network", IBM J. RES. & DEV., vol. 49, No. 2/3, Mar./May 2005, pp. 265-276.

* cited by examiner

I/O ROUTING IN A MULTIDIMENSIONAL TORUS NETWORK

CROSS-REFERENCE TO RELATED APPLICATIONS

This application is a continuation of copending U.S. patent application Ser. No. 16/404,114, filed May 6, 2019, which is a continuation of U.S. patent application Ser. No. 15/956,235, filed Apr. 18, 2018, which is a continuation of U.S. patent application Ser. No. 15/420,588, filed Jan. 31, 2017, which is a continuation of U.S. patent application Ser. No. 12/697,175, filed Jan. 29, 2010. The entire contents and disclosures of U.S. patent application Ser. Nos. 16/404,113, 15/956,235, 15/420,588 and 12/697,175 are expressly incorporated by reference herein in their entireties as if fully set forth herein.

This application claims the benefit of U.S. Patent Application Ser. Nos. 61/261,269, filed Nov. 13, 2009 for "LOCAL ROLLBACK FOR FAULT-TOLERANCE IN PARALLEL COMPUTING SYSTEMS"; 61/293,611, filed Jan. 8, 2010 for "A MULTI-PETASCALE HIGHLY EFFICIENT PARALLEL SUPERCOMPUTER"; and 61/295,669, filed Jan. 15, 2010 for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT", the entire content and disclosure of each of which is incorporated herein by reference; and is related to the following commonly-owned, co-pending United States patent applications, the entire contents and disclosure of each of which is expressly incorporated by reference herein as if fully set forth herein: U.S. patent application Ser. No. 12/684,367, filed Jan. 8, 2010, for "USING DMA FOR COPYING PERFORMANCE COUNTER DATA TO MEMORY"; U.S. patent application Ser. No. 12/684,172, filed Jan. 8, 2010 for "HARDWARE SUPPORT FOR COLLECTING PERFORMANCE COUNTERS DIRECTLY TO MEMORY"; U.S. patent application Ser. No. 12/684,190, filed Jan. 8, 2010 for "HARDWARE ENABLED PERFORMANCE COUNTERS WITH SUPPORT FOR OPERATING SYSTEM CONTEXT SWITCHING"; U.S. patent application Ser. No. 12/684,496, filed Jan. 8, 2010 for "HARDWARE SUPPORT FOR SOFTWARE CONTROLLED FAST RECONFIGURATION OF PERFORMANCE COUNTERS"; U.S. patent application Ser. No. 12/684,429, filed Jan. 8, 2010, for "HARDWARE SUPPORT FOR SOFTWARE CONTROLLED FAST MULTIPLEXING OF PERFORMANCE COUNTERS"; U.S. patent application Ser. No. 12/697,799, filed Feb. 1, 2010, for "CONDITIONAL LOAD AND STORE IN A SHARED CACHE"; U.S. patent application Ser. No. 12/684,738, filed Jan. 8, 2010, for "DISTRIBUTED PERFORMANCE COUNTERS"; U.S. patent application Ser. No. 12/684,860, filed Jan. 8, 2010, for "PAUSE PROCESSOR HARDWARE THREAD ON PIN"; U.S. patent application Ser. No. 12/684,174, filed Jan. 8, 2010, for "PRECAST THERMAL INTERFACE ADHESIVE FOR EASY AND REPEATED, SEPARATION AND REMATING"; U.S. patent application Ser. No. 12/684,184, filed Jan. 8, 2010, for "ZONE ROUTING IN A TORUS NETWORK"; U.S. patent application Ser. No. 12/684,852, filed Jan. 8, 2010, for "PROCESSOR RESUME UNIT"; U.S. patent application Ser. No. 12/684,642, filed Jan. 8, 2010, for "TLB EXCLUSION RANGE"; U.S. patent application Ser. No. 12/684,804, filed Jan. 8, 2010, for "DISTRIBUTED TRACE USING CENTRAL PERFORMANCE COUNTER MEMORY"; U.S. patent application Ser. No. 61/293,237, filed Jan. 8, 2010, for "ORDERING OF GUARDED AND UNGUARDED STORES FOR NO-SYNC I/O"; U.S. patent application Ser. No. 12/693,972, filed Jan. 26, 2010, for "DISTRIBUTED PARALLEL MESSAGING FOR MULTIPROCESSOR SYSTEMS"; U.S. patent application Ser. No. 12/688,747, filed Jan. 15, 2010, for "Support for non-locking parallel reception of packets belonging to the same reception FIFO"; U.S. patent application Ser. No. 12/688,773, filed Jan. 15, 2010, for "OPCODE COUNTING FOR PERFORMANCE MEASUREMENT"; U.S. patent application Ser. No. 12/684,776, filed Jan. 8, 2010, for "MULTI-INPUT AND BINARY REPRODUCIBLE, HIGH BANDWIDTH FLOATING POINT ADDER IN A COLLECTIVE NETWORK"; U.S. patent application Ser. No. 12/984,252, filed Jan. 4, 2011, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 13/008,502, filed Jan. 18, 2011, for "MEMORY SPECULATION IN A MULTI LEVEL CACHE SYSTEM"; U.S. patent application Ser. No. 13/008,583, filed Jan. 18, 2011-, for "SPECULATION AND TRANSACTION IN A SYSTEM SPECULATION AND TRANSACTION SUPPORT IN L2 L1 SUPPORT FOR SPECULATION/TRANSACTIONS IN A2 PHYSICAL ALIASING FOR THREAD LEVEL SPECULATION MULTIFUNCTIONING L2 CACHE CACHING MOST RECENT DIRECTORY LOOK UP AND PARTIAL CACHE LINE SPECULATION SUPPORT"; U.S. patent application Ser. No. 12/984,308, filed Jan. 4, 2011, for "MINIMAL FIRST LEVEL CACHE SUPPORT FOR MEMORY SPECULATION MANAGED BY LOWER LEVEL CACHE"; U.S. patent application Ser. No. 12/984,329, filed Jan. 4, 2011, for "PHYSICAL ADDRESS ALIASING TO SUPPORT MULTI-VERSIONING IN A SPECULATION-UNAWARE CACHE"; U.S. patent application Ser. No. 61/293,552, filed Jan. 8, 2010, for "LIST BASED PREFETCH"; U.S. patent application Ser. No. 12/684,693, filed Jan. 8, 2010, for "PROGRAMMABLE STREAM PREFETCH WITH RESOURCE OPTIMIZATION"; U.S. patent application Ser. No. 61/293,494, filed Jan. 8, 2010, for "NON-VOLATILE MEMORY FOR CHECKPOINT STORAGE"; U.S. patent application Ser. No. 61/293,476, filed Jan. 8, 2010, for "NETWORK SUPPORT FOR SYSTEM INITIATED CHECKPOINTS"; U.S. patent application Ser. No. 61/293,554, filed Jan. 8, 2010, for "TWO DIFFERENT PREFETCHING COMPLEMENTARY ENGINES OPERATING SIMULTANEOUSLY"; U.S. patent application Ser. No. 12/697,015, filed Jan. 29, 2010, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 61/293,559, filed Jan. 8, 2010, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 61/293,569, filed Jan. 8, 2010, for "IMPROVING THE EFFICIENCY OF STATIC CORE TURNOFF IN A SYSTEM-ON-A-CHIP WITH VARIATION"; U.S. patent application Ser. No.

12/697,043, filed Jan. 29, 2010, for "IMPLEMENTING ASYNCHRONOUS COLLECTIVE OPERATIONS IN A MULTI-NODE PROCESSING SYSTEM"; U.S. patent application Ser. No. 13/008,546, filed Jan. 18, 2011, for "MULTIFUNCTIONING CACHE"; U.S. patent application Ser. No. 12/684,287, filed Jan. 8, 2010 for "ARBITRATION IN CROSSBAR INTERCONNECT FOR LOW LATENCY"; U.S. patent application Ser. No. 12/684,630, filed Jan. 8, 2010 for "EAGER PROTOCOL ON A CACHE PIPELINE DATAFLOW"; U.S. patent application Ser. No. 12/723,277, filed Mar. 12, 2010 for "EMBEDDING GLOBAL BARRIER AND COLLECTIVE IN A TORUS NETWORK"; U.S. patent application Ser. No. 61/293,499, filed Jan. 8, 2010 for "GLOBAL SYNCHRONIZATION OF PARALLEL PROCESSORS USING CLOCK PULSE WIDTH MODULATION"; U.S. patent application Ser. No. 61/293,266, filed Jan. 8, 2010 for "IMPLEMENTATION OF MSYNC"; U.S. patent application Ser. No. 12/796,389, filed Jun. 8, 2010 for "NON-STANDARD FLAVORS OF MSYNC"; U.S. patent application Ser. No. 12/696,817, filed Jan. 29, 2010 for "HEAP/STACK GUARD PAGES USING A WAKEUP UNIT"; U.S. patent application Ser. No. 61/293,603, filed Jan. 8, 2010 for "MECHANISM OF SUPPORTING SUB-COMMUNICATOR COLLECTIVES WITH O(64) COUNTERS AS OPPOSED TO ONE COUNTER FOR EACH SUB-COMMUNICATOR"; and U.S. patent application Ser. No. 12/774,475, filed May 5, 2010 for "REPRODUCIBILITY IN A MULTIPROCESSOR SYSTEM".

GOVERNMENT CONTRACT

This invention was made with government support under Contract No. B554331 awarded by the Department of Energy. The Government has certain rights in this invention.

BACKGROUND OF THE INVENTION

Field of the Invention

This invention generally relates to parallel computing systems, and more specifically, to routing I/O packets between compute nodes and I/O nodes in a parallel computing system.

Background Art

Massively parallel computing structures (also referred to as "ultra-scale or "supercomputers") interconnect large numbers of compute nodes, generally, in the form of very regular structures, such as mesh, lattices, or torus configurations. The conventional approach for the most cost/effective ultrascalable computers has been to use processors configured in uni-processors or symmetric multiprocessor (SMP) configurations, wherein the SMPs are interconnected with a network to support message passing communications. Today, these supercomputing machines exhibit computing performance achieving hundreds of teraflops.

One family of such massively parallel computers has been developed by the International Business Machines Corporation (IBM) under the name Blue Gene. Two members of this family are the Blue Gene/L system and the Blue Gene/P system. The Blue Gene/L system is a scalable system having over 65,000 compute nodes. Each node is comprised of a single application specific integrated circuit (ASIC) with two CPUs and memory. The full computer system is housed in sixty-four racks or cabinets with thirty-two node boards in each rack.

The Blue Gene/L computer system structure can be described as a compute node core with an I/O node surface, where communication to the compute nodes is handled by the I/O nodes. In the compute node core, the compute nodes are arranged into both a logical tree structure and a multi-dimensional torus network. The logical tree network connects the compute nodes in a tree structure so that each node communicates with a parent and one or two children. The torus network logically connects the compute nodes in a three-dimensional lattice like structure that allows each compute node to communicate with its closest 6 neighbors in a section of the computer.

In the Blue Gene/Q system, the compute nodes comprise a multidimensional torus or mesh with N dimensions and that the I/O nodes also comprise a multidimensional torus or mesh with M dimensions. N and M may be different. for scientific computers, typically N>M. Compute nodes do not typically have I/O devices such as disks attached to them, while I/O nodes may be attached directly to disks, or to a storage area network.

Each node in a D dimensional torus has 2D links going out from it. For example, the BlueGene/L computer system (BG/L) and the BlueGene/P computer system (BG/P) have D=3. The I/O nodes in BG/L and BG/P do not communicate with one another over a torus network. Also, in BG/L and BG/P, compute nodes communicate with I/O nodes via a separate collective network. To reduce costs, it is desirable to have a single network that supports point-point, collective, and I/O communications. Also, the compute and I/O nodes may be built using the same type of chips. Thus, for I/O nodes, when M<N, this means simply that some dimensions are not used, or wired, within the I/O torus. To provide connectivity between compute and I/O nodes, each chip has circuitry to support an extra bidirectional I/O link. Generally this I/O link is only used on a subset of the compute nodes. Each I/O node generally has its I/O link attached to a compute node. Optionally, each I/O node may also connect it's unused I/O torus links to a compute node.

In BG/L, point-to-point packets are routed by placing both the destination coordinates and "hint" bits in the packet header. There are two hint bits per dimension indicating whether the packet should be routed in the plus or minus direction; at most one hint bit per dimension may be set. As the packet routes through the network, the hint bit is set to zero as the packet exits a node whose next (neighbor) coordinate in that direction is the destination coordinate. Packets can only move in a direction if its hint bit is set in that direction. Upon reaching its destination, all hint bits are 0. On BG/L, BG/P and BG/Q, there is hardware support, called a hint bit calculator, to compute the best hint bit settings for when packets are injected into the network.

BRIEF SUMMARY

Embodiments of the invention provide a method, system and computer program product for routing data packet in a computing system comprising a multidimensional torus compute node network including a multitude of compute nodes, and an I/O node network including a plurality of I/O nodes. In one embodiment, the method comprises assigning to each of the data packets a destination address identifying one of the compute nodes; providing each of the data packets with a toio value; routing the data packets through the compute node network to the destination addresses of the data packets; and when each of the data packets reaches the destination address assigned to said each data packet, routing said each data packet to one of the I/O nodes if the toio value of said each data packet is a specified value.

In an embodiment, some or all of the compute nodes are connected to an associated one of the I/O nodes, and the routing said each data packet to one of the I/O nodes includes routing said each data packet to the I/O node associated with the compute node identified by the destination address assigned to said each data packet. In one embodiment, some or all of the compute nodes are connected to an associated one of the I/O nodes by an associated I/O link, and the routing said each data packet to one of the I/O nodes includes routing said each data packet to the I/O node associated with the compute node identified by the destination address over the associated I/O link.

In one embodiment, each of the data packets is also provided with an ioreturn value, and the routing the data packets through the torus network includes using the ioreturn values to route the data packets from an I/O node to a destination compute node through the torus network. In an embodiment, the using the ioreturn values includes using the ioreturn values to route the data packets from one of the I/O nodes to an associated compute node and then to another of the compute nodes as specified in the packet's destination address. In an embodiment, the compute nodes and the I/O nodes are connected by a multitude of links, and the ioreturn values identify the first link over which to route the data packets.

In one embodiment, certain of the torus links on the I/O nodes can be configured in such a way that they are used as additional I/O links into and out of that I/O node; thus each node may be attached to more than one compute node.

DETAILED DESCRIPTION

Figure 1:
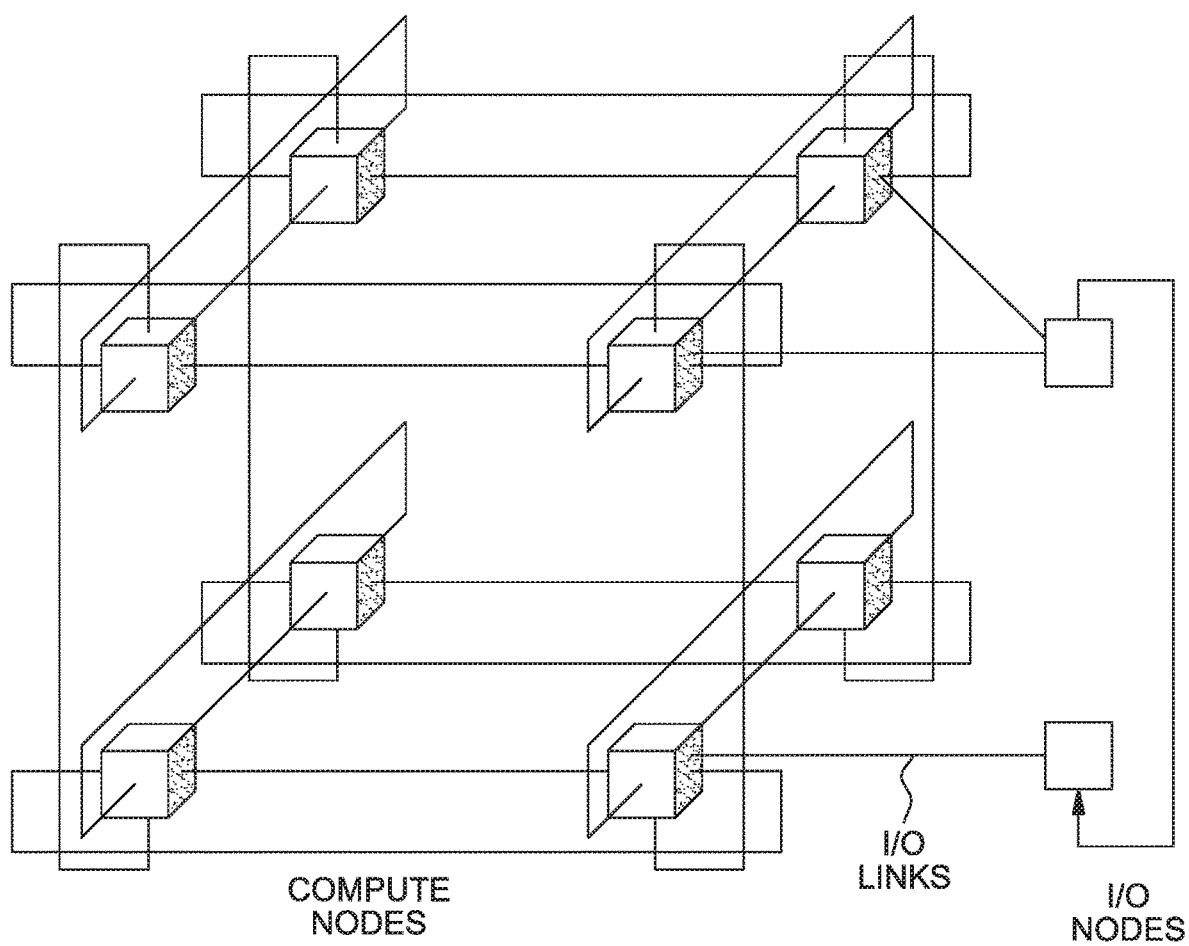
FIG. 1 depicts a unit cell of a three-dimensional compute torus implemented in a massively parallel supercomputer with I/O links attaching it to a one-dimensional I/O torus.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention relates to routing I/O packets between compute nodes and I/O nodes in a parallel computing system. The invention may be implemented, in an embodiment, in a massively parallel computer architecture, referred to as a supercomputer. As a more specific example, the invention, in an embodiment, may be implemented in a massively parallel computer developed by the International Business Machines Corporation (IBM) under the name Blue Gene/Q. The Blue Gene/Q is expandable to 512 compute racks, each with 1024 compute node ASICs (BQC) including 16 PowerPC A2 processor cores at 1600 MHz. Each A2 core has associated a quad-wide fused multiply-add SIMD floating point unit, producing 8 double precision operations per cycle, for a total of 128 floating point operations per cycle per compute chip. Cabled as a single system, the multiple racks can be partitioned into smaller systems by programming switch chips, termed the BG/Q Link ASICs (BQL), which source and terminate the optical cables between midplanes.

Each compute rack is comprised of 2 sets of 512 compute nodes. Each set is packaged around a doubled-sided backplane, or midplane, which supports a five-dimensional torus of size 4×4×4×4×2 which is the communication network for the compute nodes which are packaged on 16 node boards. This tori network can be extended in 4 dimensions through link chips on the node boards, which redrive the signals optically with an architecture limit of 64 to any torus dimension. The signaling rate in 10 Gb/s, 8/10 encoded), over ~20 meter multi-mode optical cables at 850 nm. As an example, a 96-rack system is connected as a 16×16×16×12×2 torus, with the last ×2 dimension contained wholly on the midplane. For reliability reasons, small torus dimensions of 8 or less may be run as a mesh rather than a torus with minor impact to the aggregate messaging rate.

The Blue Gene/Q platform contains four kinds of nodes: compute nodes (CN), I/O nodes (ION), login nodes (LN), and service nodes (SN). The CN and ION share the same compute ASIC.

In addition, associated with a prescribed plurality of processing nodes is a dedicated node that comprises a quad-processor with external memory, for handling of I/O communications to and from the compute nodes. Each I/O node has an operating system that can handle basic tasks and all the functions necessary for high performance real time code. The I/O nodes contain a software layer above the layer on the compute nodes for handling host communications. The choice of host will depend on the class of applications and their bandwidth and performance requirements.

In an embodiment, each compute node of the massively parallel computer architecture is connected to six neighboring nodes via six bi-directional torus links, as depicted in the three-dimensional torus sub-cube portion shown in FIG. 1. FIG. 1 also depicts a one dimensional I/O torus with two I/O nodes. FIG. 1 depicts three I/O links from three different compute nodes to two different I/O nodes. It is understood, however, that other architectures comprising more or fewer processing nodes in different torus configurations (i.e., different numbers of racks) may also be used.

The ASIC that powers the nodes is based on system-on-a-chip (s-o-c) technology and incorporates all of the functionality needed by the system. The nodes themselves are physically small allowing for a very high density of processing and optimizing cost/performance.

Figure 2:
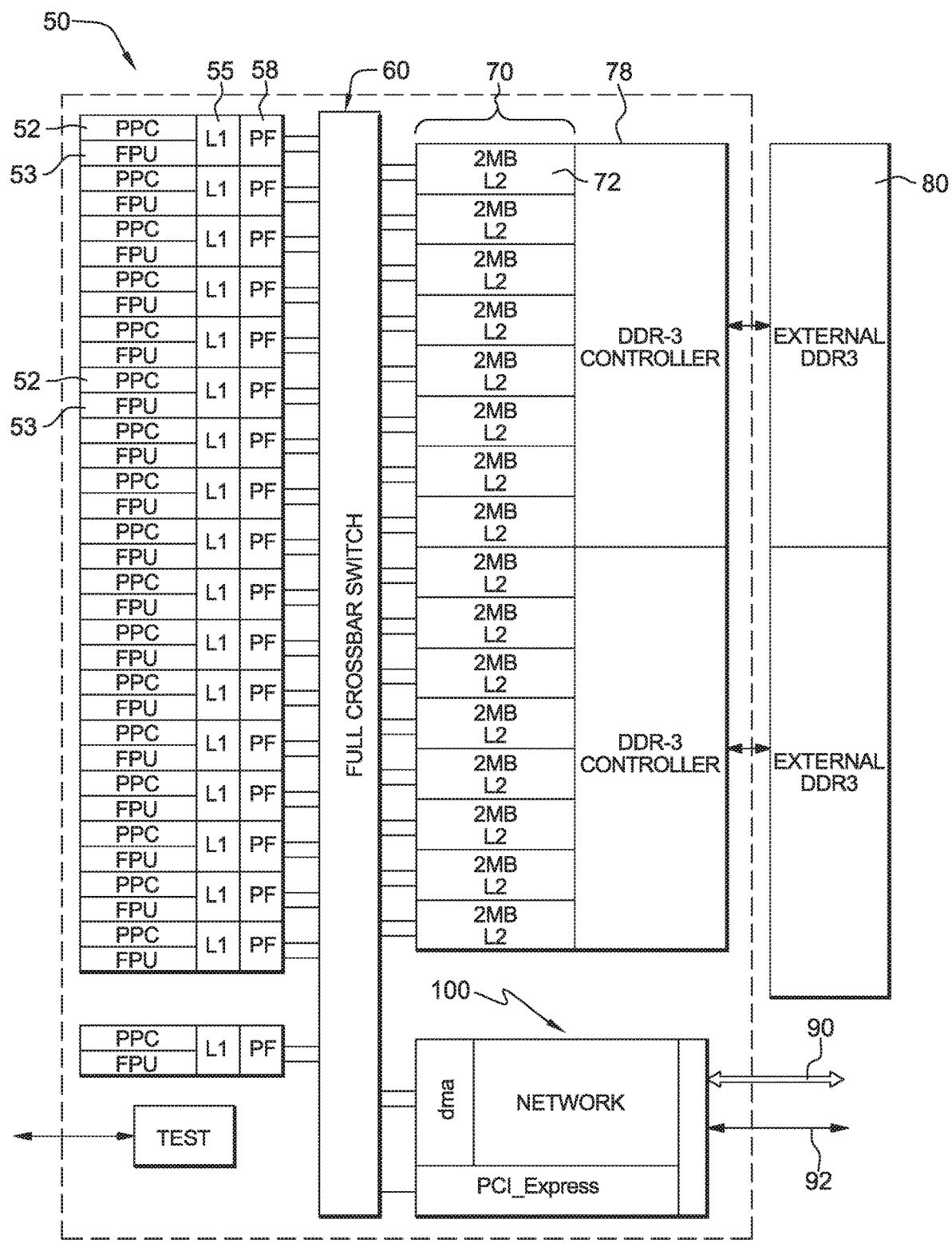
FIG. 2 is a block diagram of a node of the supercomputer.

Referring now to FIG. 2, there is shown the overall architecture of the multiprocessor computing node 50 implemented in a parallel computing system in which the present invention is implemented. In one embodiment, the multiprocessor system implements the proven Blue Gene® architecture, and is implemented in a BlueGene/Q massively parallel computing system comprising, for example, 1024 compute node ASICs (BCQ), each including multiple processor cores.

A compute node of this present massively parallel supercomputer architecture and in which the present invention may be employed is illustrated in FIG. 2. The compute node 50 is a single chip ("nodechip") based on low power A2 PowerPC cores, though the architecture can use any low power cores, and may comprise one or more semiconductor chips. In the embodiment depicted, the node includes 16 PowerTC A2 at 1600 MHz, in cores in one embodiment.

More particularly, the basic nodechip 50 of the massively parallel supercomputer architecture illustrated in FIG. 2 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 on each core (204.8 GF peak node). In one implementation, the core operating frequency target is 1.6 GHz providing, for example, a 563 GB/s bisection bandwidth to shared L2 cache 70 via a full crossbar switch 60. In one embodiment, there is provided 32 MB of shared L2 cache 70, each core having associated 2 MB of L2 cache 72. There is further provided external DDR SDRAM (e.g., Double Data Rate synchronous dynamic random access) memory 80, as a lower level in the memory hierarchy in communication with the L2. In one embodiment, the node includes 42.6 GB/s DDR3 bandwidth (1.333 GHz DDR3) (2 channels each with chip kill protection).

Each FPU 53 associated with a core 52 has a 32 B wide data path to the L1-cache 55 of the A2, allowing it to load or store 32 B per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 55 is 32B wide and the load interface is 16B wide, both operating at processor frequency. The L1P 55 implements a fully associative, 32 entry prefetch buffer. Each entry can hold an L2 line of 128 B size. The L1P provides two prefetching schemes for the private prefetch unit 58: a sequential prefetcher as used in previous Blue-Gene architecture generations, as well as a list prefetcher.

As shown in FIG. 2, the 32 MiB shared L2 is sliced into 16 units, each connecting to a slave port of the switch 60. Every physical address is mapped to one slice using a selection of programmable address bits or a XOR-based hash across all address bits. The L2-cache slices, the L1Ps and the L1-D caches of the A2s are hardware-coherent. A group of 4 slices is connected via a ring to one of the two DDR3 SDRAM controllers 78.

By implementing a direct memory access engine referred to herein as a Messaging Unit, "MU" such as MU 100, with each MU including a DMA engine and Network Card interface in communication with the XBAR switch, chip I/O functionality is provided. In one embodiment, the compute node further includes, in a non-limiting example: 10 intra-rack interprocessor links 90, each at 2.0 GB/s, for example, i.e., 10*2 GB/s intra-rack & inter-rack (e.g., configurable as a 5-D torus in one embodiment); and, one I/O link 92 interfaced with the MU at 2.0 GB/s (2 GB/s I/O link (to I/O subsystem)) is additionally provided. The system node employs or is associated and interfaced with a 8-16 GB memory/node. The ASIC may consume up to about 30 watts chip power.

Although not shown, each A2 core has associated a quad-wide fused multiply-add SIMD floating point unit, producing 8 double precision operations per cycle, for a total of 128 floating point operations per cycle per compute chip. A2 is a 4-way multi-threaded 64b PowerPC implementation. Each A2 core has its own execution unit (XU), instruction unit (IU), and quad floating point unit (QPU) connected via the AXU (Auxiliary eXecution Unit) (FIG. 2). The QPU is an implementation of the 4-way SIMD QPX floating point instruction set architecture. QPX is an extension of the scalar PowerPC floating point architecture. It defines 32 32 B-wide floating point registers per thread instead of the traditional 32 scalar 8 B-wide floating point registers.

The present invention, in an embodiment, provides a mechanism whereby certain of the torus links on the I/O nodes can be configured in such a way that they are used as additional I/O links into and out of that I/O node; thus each I/O node may be attached to more than one compute node.

In one embodiment of the invention, in order to route I/O packets, there is a separate virtual channel (VC) and separate network injection and reception Fifos for I/O traffic. Each VC has its own internal network buffers; thus system packets use different internal buffers than user packets. All I/O packets use the system VC. The VC may also be used for kernel-to-kernel communication on the compute nodes, but this VC may not be used for user packets.

Figure 3:
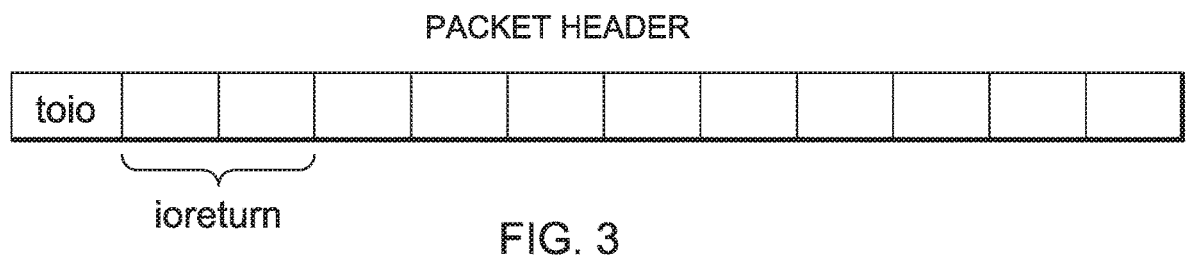
FIG. 3 shows a packet header with toio and ioreturn bits in accordance with an embodiment of the invention.

In addition, with reference to FIG. 3, the packet header has an additional toio bit. the hint bits and coordinates control the routing of the packet until all hint bits have been set to 0, i.e., when the packet reaches the compute node whose coordinates equal the destination in the packet. If the node is a compute node and the toio bit is 0, the packet is received at that node. If the node is a compute node and the toio bit is 1, the packet is sent over the I/O link and is received by the I/O node at the other end of the link. The last compute node in such a route is called the I/O exit node. The destination address in the packet is the address of the I/O exit node. In an embodiment, on the exit node, the packet is not placed into the memory of the node and need not be re-injected into the network. This reduces memory and processor utilization on the exit nodes.

The packet header also has additional ioreturn bits. When a packet is injected on an I/O node, if the ioreturn bits are not set, the packet is routed to another I/O node on the I/O torus using the hint bits and destination. If the ioreturn bits are set, they indicate which link the packet should be sent out on first. This may be the I/O link, or one of the other torus links that are not used for intra-I/O node routing.

When a packet with the ioreturn bits set arrives at a compute node (the I/O entrance node), the network logic has an I/O link hint bit calculator. If the hint bits in the header are 0, this hint bit calculator inspects the destination coordinates, and sets the hint bits appropriately. Then, if any hint bits are set, those hint bits are used to route the packet to its final compute node destination. If hint bits are already set in the packet when it arrives at the entrance node, those hint bits are used to route the packet to its final compute node destination. In an embodiment, on the entrance node, packets for different compute nodes are not placed into the memory of the entrance node and need not be re-injected into the network. This reduces memory and processor utilization on the entrance nodes.

On the I/O VC, within the compute or I/O torus packets are routed deterministically following rules referred to as the "bubble" rules. When a packet enters the I/O link from a compute node, the bubble rules are modified so that only one token is required to go on the I/O link (rather than two as in strict bubble rules). Similarly, when a packet with the ioreturn bits set is injected into the network, the packet only requires one, rather than the usual two tokens.

If the compute nodes are a mesh in a dimension, then the ioreturn bits can be used to increase bandwidth between compute and IO nodes. At the end of the mesh in a dimension, instead of wrapping a link back to another compute node, a link in that dimension may be connected instead to an I/O node. Such a compute node can inject packets with ioreturn bits set that indicate which link to use (connected to an I/O node). If a link hint bit calculator is attached to the node on the other end of the link, the packet can route to a different I/O node. However, with the mechanism described above. This extra link to the I/O nodes can only be used for packets injected at that compute node. This restriction could be avoided by having multiple toio bits in the packet, where the bit indicates which outgoing link to the I/O node should be used.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of operating nodes in a computing system comprising a multidimensional torus compute node network including a multitude of compute nodes, and an input/output (I/O) node network including a plurality of I/O nodes, the method comprising:
routing a multitude of data packets, by one or more processing units of the computing system, through the compute node network, including assigning to each of the data packets a destination address identifying one of the compute nodes as a destination node of said each data packet;

providing, by the one or more processing units, each of the data packets with an ioreturn value;

routing each of the data packets, by the one or more processing units, through the compute node network to the destination addresses of the data packets; and when the data packets reach the destination nodes, further routing each of the data packets, by the one or more processing units, to one of the I/O nodes; and when each of the data packets reaches said one of the I/O nodes, operating said one of the I/O nodes to route said each data packet selectively, based on the value of the ioreturn value, to one of another one of the I/O nodes, and one of the compute nodes; and wherein the compute nodes and the I/O nodes are connected by a multitude of links, and the operating said one of the I/O nodes to route said each data packet selectively, based on the value of the ioreturn value, to one of another one of the I/O nodes, and one of the compute nodes includes using the ioreturn value of the each data packet to identify one of the multitude of links over which to route the each data packet from said one of the I/O nodes.

2. The method according to claim 1, wherein the operating said one of the I/O nodes to route said each data packet selectively includes operating said one of the I/O nodes to route said each data packet to the another one of the I/O nodes when the ioreturn value of the each data packet has a first specified value.

3. The method according to claim 2, wherein the operating said one of the I/O nodes to route said each data packet to the another one of the I/O nodes includes using the ioreturn value to identify the another one of the I/O nodes to which to route the each data packet.

4. The method according to claim 2, wherein the operating said one of the I/O nodes to route said each data packet selectively further includes operating said one of the I/O nodes to route said each data packet to the one of the compute nodes when the ioreturn value of the each data packet has a second specified value.

5. The method according to claim 4, wherein the operating said one of the I/O nodes to route said each data packet to the one of the compute nodes further includes using the ioreturn value to identify one of the multitude of links over which to route the each data packet to the one of the compute nodes.

6. The method according to claim 1, further comprising said one of the compute nodes further routing the each data packet to another one of the compute nodes.

7. The method according to claim 6, wherein the one of the compute nodes further routing the each data packet to another one of the compute nodes includes using the ioreturn value of said each data packet to identify said another one of the compute nodes.

8. The method according to claim 7, wherein the one of the compute nodes further routing the each data packet to another one of the compute nodes further includes using hint bits in the each data packet to route said each data packet to said another one of the compute nodes.

9. The method according to claim 8, wherein the one of the compute nodes further routing the each data packet to another one of the compute nodes further includes said one of the compute nodes setting the hint bits in the each data packet to route said each data packet to said another one of the compute nodes.

10. A node operating system in a computing system comprising a multidimensional compute node torus network including a multitude of compute nodes, and an I/O node network including a plurality of input/output (I/O) nodes, the node operating system comprising one or more processing units configured for:

routing a multitude of data packets through the compute node network, including assigning to each of the data packets a destination address identifying one of the compute nodes as a destination node of said each data packet;

providing each of the data packets with an ioreturn value;

routing each of the data packets through the compute node network to the destination addresses of the data packets; and when the data packets reach the destination nodes, further routing each of the data packets to one of the I/O nodes; and when each of the data packets reaches said one of the I/O nodes, operating said one of the I/O nodes to route said each data packet selectively, based on the value of the ioreturn value, to one of another one of the I/O nodes, and one of the compute nodes; and wherein the compute nodes and the I/O nodes are connected by a multitude of links, and the operating said one of the I/O nodes to route said each data packet selectively, based on the value of the ioreturn value, to one of another one of the I/O nodes, and one of the compute nodes includes using the ioreturn value of the each data packet to identify one of the multitude of links over which to route the each data packet from said one of the I/O nodes.

11. The node operating system according to claim 10, wherein the operating said one of the I/O nodes to route said each data packet selectively includes operating said one of the I/O nodes to route said each data packet to the another one of the I/O nodes when the ioreturn value of the each data packet has a first specified value.

12. The node operating system according to claim 11, wherein the operating said one of the I/O nodes to route said each data packet to the another one of the I/O nodes includes using the ioreturn value to identify the another one of the I/O nodes to which to route the each data packet.

13. The node operating system according to claim 11, wherein the operating said one of the I/O nodes to route said each data packet selectively further includes operating said one of the I/O nodes to route said each data packet to the one of the compute nodes when the ioreturn value of the each data packet has a second specified value.

14. The node operating system according to claim 13, wherein the operating said one of the I/O nodes to route said each data packet to the one of the compute nodes further includes using the ioreturn value to identify one of the multitude of links over which to route the each data packet to the one of the compute nodes.

15. An article of manufacture comprising:

at least one tangible computer readable device having computer readable program code logic tangibly embodied therein to execute machine instructions in one or more processing units for operating nodes in a computing system comprising a multidimensional torus compute node network including a multitude of compute nodes, and an input/output (I/O) node network including a plurality of I/O nodes, said computer readable program code logic, when executing, performing the following:

routing a multitude of data packets through the compute node network, including assigning to each of the data packets a destination address identifying one of the compute nodes as a destination node of said each data packet;

providing each of the data packets with an ioreturn value;

routing each of the data packets through the compute node network to the destination addresses of the data packets; and when the data packets reach the destination nodes, further routing each of the data packets to one of the I/O nodes; and when each of the data packets reaches said one of the I/O nodes, operating said one of the I/O nodes to route said each data packet selectively, based on the value of the ioreturn value, to one of another one of the I/O nodes, and one of the compute nodes; and wherein the compute nodes and the I/O nodes are connected by a multitude of links, and the operating said one of the I/O nodes to route said each data packet selectively, based on the value of the ioreturn value, to one of another one of the I/O nodes, and one of the compute nodes includes using the ioreturn value of the each data packet to identify one of the multitude of links over which to route the each data packet from said one of the I/O nodes.

16. The article of manufacture according to claim 15, wherein the operating said one of the I/O nodes to route said each data packet selectively includes operating said one of the I/O nodes to route said each data packet to the another one of the I/O nodes when the ioreturn value of the each data packet has a first specified value.

17. The article of manufacture according to claim 16, wherein the operating said one of the I/O nodes to route said each data packet to the another one of the I/O nodes includes using the ioreturn value to identify the another one of the I/O nodes to which to route the each data packet.

18. The article of manufacture according to claim 16, wherein the operating said one of the I/O nodes to route said each data packet selectively further includes operating said one of the I/O nodes to route said each data packet to the one of the compute nodes when the ioreturn value of the each data packet has a second specified value.

19. The article of manufacture according to claim 18, wherein the operating said one of the I/O nodes to route said each data packet to the one of the compute nodes further includes using the ioreturn value to identify one of the multitude of the links over which to route the each data packet to the one of the compute nodes.

* * * * *